United States Patent
Johnson et al.

(10) Patent No.: US 12,073,373 B2
(45) Date of Patent: *Aug. 27, 2024

(54) REAL-TIME BIO-METRIC / ENVIRONMENTAL CAPTURE AND TIMED REMATCH

(71) Applicant: Toshiba Global Commerce Solutions Holdings Corporation, Tokyo (JP)

(72) Inventors: Brad M. Johnson, Raleigh, NC (US); Adrian X. Rodriguez, Durham, NC (US); David John Steiner, Raleigh, NC (US); Neil A. Girard, Pittsboro, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 781 days.

This patent is subject to a terminal disclaimer.

(21) Appl. No.: 16/668,456

(22) Filed: Oct. 30, 2019

(65) Prior Publication Data

US 2021/0133715 A1    May 6, 2021

(51) Int. Cl.
*G06Q 20/20* (2012.01)
*G06Q 20/40* (2012.01)
(Continued)

(52) U.S. Cl.
CPC ....... *G06Q 20/20* (2013.01); *G06Q 20/40145* (2013.01)

(58) Field of Classification Search
CPC .......... G06Q 20/20; G06Q 20/40145
See application file for complete search history.

(56) References Cited

U.S. PATENT DOCUMENTS 8,260,042 B2    9/2012 Peng et al.
9,031,858 B2    5/2015 Angell et al.
(Continued)

FOREIGN PATENT DOCUMENTS

WO    2018064765 A1    4/2018

OTHER PUBLICATIONS

P. M. Corcoran, "Biometrics and Consumer Electronics: A Brave New World or the Road to Dystopia? [Soapbox]," in IEEE Consumer Electronics Magazine, vol. 2, No. 2, pp. 22-33, Apr. 2013, doi: 10.1109/MCE.2013.2239152. (Year: 2013).*

(Continued)

*Primary Examiner* — Talia F Crawley
(74) *Attorney, Agent, or Firm* — Coats and Bennett, PLLC

(57) ABSTRACT

Pay stations in a retail store initiate customer transactions for customers. When a first pay station is unable to complete a customer transaction, it hands the transaction off to a second pay station that is able to complete the transaction. During hand off, the first pay station determines a first set of biometric and contextual data associated with the customers and sends that information to the second pay station. The second pay station then determines, independently, a second set of biometric and contextual data associated with the customers and compares it against the first set. Depending on the results of the comparison, customers are either granted or denied access at the second pay station to complete the transaction. Additionally, all biometric and contextual data are permanently destroyed without being saved to memory.

9 Claims, 7 Drawing Sheets

(51) Int. Cl.

| | |
|---|---|
| *G06Q 30/0601* | (2023.01) |
| *G06V 10/44* | (2022.01) |
| *G06V 20/30* | (2022.01) |
| *G06V 20/52* | (2022.01) |
| *G06V 30/10* | (2022.01) |
| *G06V 30/18* | (2022.01) |
| *G06V 30/19* | (2022.01) |
| *G06V 40/10* | (2022.01) |
| *G06V 40/70* | (2022.01) |

(56) References Cited

U.S. PATENT DOCUMENTS

| | | | |
|---|---|---|---|
| 9,087,215 B2 | 7/2015 | LaFever et al. | |
| 9,135,419 B2 | 9/2015 | Newman et al. | |
| 9,159,187 B2 | 10/2015 | Thackston | |
| 9,348,988 B2 | 5/2016 | Dykstra-Erickson et al. | |
| 9,519,901 B1 | 12/2016 | Dorogusker | |
| 9,578,023 B2 | 2/2017 | Popovich et al. | |
| 9,842,211 B2 | 12/2017 | Krishnapura | |
| 10,061,910 B2 | 8/2018 | Bali et al. | |
| 2004/0133477 A1* | 7/2004 | Morris | G06Q 30/0603 348/E7.086 |
| 2005/0154646 A1* | 7/2005 | Chermesino | G06Q 30/0641 705/26.61 |
| 2008/0249883 A1* | 10/2008 | Daily | G07G 1/009 705/23 |
| 2010/0174914 A1 | 7/2010 | Shafir | |
| 2011/0238296 A1* | 9/2011 | Purks | G06Q 30/0631 705/26.7 |
| 2013/0016883 A1 | 1/2013 | Whillock et al. | |
| 2013/0215275 A1* | 8/2013 | Berini | G06V 10/993 348/150 |
| 2013/0268379 A1* | 10/2013 | Anderson | G06Q 20/322 705/20 |
| 2014/0201080 A1* | 7/2014 | Just | G06Q 30/0601 705/44 |
| 2014/0244411 A1* | 8/2014 | Kim | G06Q 30/0281 705/16 |
| 2014/0324610 A1* | 10/2014 | Ans | G06Q 20/1085 705/21 |
| 2014/0330655 A1 | 11/2014 | Aziz et al. | |
| 2016/0055474 A1* | 2/2016 | Syed | H04W 4/029 705/39 |
| 2017/0308694 A1 | 10/2017 | Belavadi | |
| 2018/0225615 A1* | 8/2018 | Thomas | G06Q 10/0633 |
| 2018/0240126 A1* | 8/2018 | Miyagi | G06Q 30/016 |
| 2018/0247168 A1* | 8/2018 | Syed | G06Q 20/325 |
| 2018/0268414 A1 | 9/2018 | Chung et al. | |
| 2018/0315035 A1* | 11/2018 | Johnson | G06Q 20/202 |
| 2019/0050550 A1* | 2/2019 | Berini | G06V 10/28 |
| 2019/0205855 A1* | 7/2019 | Simon | G06Q 20/202 |
| 2020/0054153 A1* | 2/2020 | Naito | G07G 1/06 |
| 2021/0264487 A1* | 8/2021 | Rodriguez | G06Q 20/4014 |
| 2022/0261813 A1* | 8/2022 | Mimassi | G06Q 20/40145 |

OTHER PUBLICATIONS

Witte, H. et al., "Context-Aware Mobile Biometric Authentication based on Support Vector Machines", Fourth International Conference on Emerging Security Technologies, Sep. 9-11, 2013, pp. 1-5, IEEE.

* cited by examiner

PROCESSING CIRCUITRY
132

CUSTOMER TRANSACTION PROCESSING MODULE/UNIT
150

IMAGE CAPTURE AND ANALYSIS MODULE/UNIT
152

CUSTOMER DATA OBTAINING MODULE/UNIT
154

CUSTOMER IDENTIFICATION INFORMATION GENERATION MODULE/UNIT
156

CUSTOMER AUTHENTICATION MODULE/UNIT
158

PAY-STATION IDENTIFICATION AND SELECTION MODULE/UNIT
160

CUSTOMER IDENTIFICATION INFORMATION DESTRUCTION MODULE/UNIT
162

COMMUNICATIONS INTERFACE MODULE/UNIT
164

REAL-TIME BIO-METRIC / ENVIRONMENTAL CAPTURE AND TIMED REMATCH

TECHNICAL FIELD

The present disclosure relates generally to computers for retail stores, and more particularly to computers that identify customers and link them to selected pay-stations to finish a transaction.

BACKGROUND

Biometric data comprises information representing one or more of the physical, physiological, and behavioral characteristics of a person. Such biometric data includes, but is not limited to, data associated with facial recognition, retina and/or iris recognition, fingerprints, voice recognition, handwriting, and the geometry of an individual's veins. Generally, biometric data is used to uniquely digitally identify a person, and is very helpful to law enforcement and government agencies in identifying possible threats and criminals.

Aside from its usefulness in a security context, however, biometric data can also be advantageous to retailers. For example, knowing exactly who is in a store can help a retailer understand, in advance, the particular likes and/or dislikes a person has with respect to the products they offer. Armed with such information, retailers can then send the customer targeted advertisements or coupons for products they may purchase. However, although biometric data can be used to positively impact the "customer experience," many people consider their biometric data private and do not want retailers to store or maintain such information.

BRIEF DESCRIPTION OF THE DRAWINGS

FIG. 6 is a functional block diagram illustrating a computer program product configured to control a computer to route customers to different SCO station according to one embodiment of the present disclosure.

DETAILED DESCRIPTION

Figure 1:
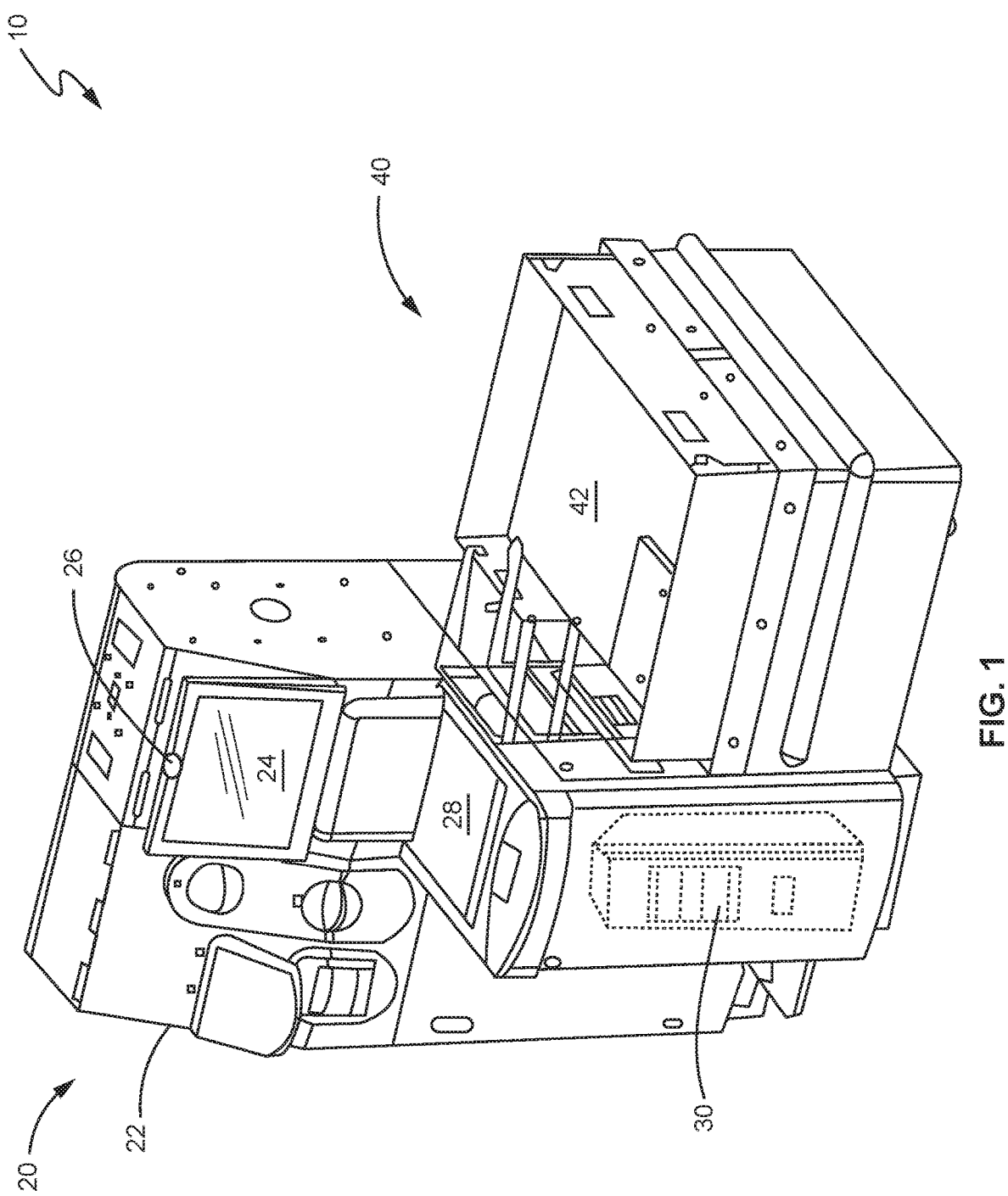
FIG. 1 is a perspective view illustrating a self-checkout (SCO) station configured according to one embodiment of the present disclosure.

Embodiments of the present disclosure provide a computer, a method, and a corresponding non-transitory, computer-readable storage medium for checking out customers from a retail store. In particular, the present embodiments configure pay stations (e.g., self-checkout (SCO) stations) that have started a customer transaction to determine whether they are able to complete the transaction, and if not, route or direct the customers to a different pay station that is able to complete the transaction. The decision on which particular pay station(s) customers are to be routed to may be based, for example, on the requirements and/or needs of the customer, the retailer, or both.

For example, consider a situation in which a customer who wants to pay for products with cash, but initiates a transaction at a first SCO station that only accepts payment via credit or debit cards. With conventional systems, the customer would either have to complete the transaction using a credit card, or abort the transaction altogether. In the latter case, the customer would also be forced to locate another SCO station that is configured to process cash payments, and begin the check-out process all over again. Customers typically deem such situations a nuisance. However, with an SCO configured according to the present embodiments the customer would be routed to a different "target" SCO station that is configured to handle cash payments. Additionally, data uniquely identifying the customer and any transaction data already provided by the customer would also be sent to the target SCO station. Upon arriving at the target SCO station, the customer would be authenticated by the target SCO station, and provided the authentication is successful, allowed to complete the transaction.

Authentication according to the present embodiments is based on a combination of a customer's biometric data (e.g., data associated with facial recognition, retina and/or iris recognition, fingerprints, voice recognition, handwriting, the geometry of an individual's veins, and the like) and the customer's "contextual" data (e.g., the color of one or more articles of the customer's clothing, the type and/or existence of headgear or clothing, and the like). In one aspect, for example, the customer's biometric and contextual data is captured at the first SCO station when the customer initiates the transaction, and then again at the target SCO station when the customer arrives to complete the transaction. The two data sets are compared. Provided the data in the data sets match to within a predetermined threshold (e.g., 5%), the customer is authenticated and authorized to complete the transaction at the target SCO station.

As previously stated, many customers consider biometric data to be personal, and for privacy reasons, do not want retailers to store or maintain such data in storage. Therefore, in accordance with the present disclosure, the SCO stations do not retain the captured biometric and contextual data in memory, or send that data to any other devices for long term storage. Rather, the SCO stations involved in the transaction proactively destroy the data permanently without saving the data.

Turning now to the drawings, FIG. 1 illustrates an SCO station 10 configured according to one embodiment of the present disclosure. As seen in FIG. 1, SCO station 10 comprises, inter alia, a terminal section 20 and a bagging section 40. Terminal section 20 comprises a payment processing unit 22 for facilitating customer payments, a display 24 for displaying information associated with the items being purchased to the customer, a camera 26 for capturing images of a customer associated with a transaction, a scanner/scale 28 for allowing the customer to scan and/or weigh an item he/she wishes to purchase, and a computer 30. The bagging section 40 comprises a receiving area 42 having a generally flat bottom surface and is configured to receive items after they have been scanned by the customer using scanner/scale 28.

As described in more detail later, SCO station 10 may be configured to operate as an "initiating" SCO station (i.e., an SCO station at which a customer initiates a transaction), and/or as a "target" SCO station (i.e., an SCO station at which the customer completes the transaction). In both cases, not only is computer 30 configured to control the operation of the terminal section 20, but according to the present disclosure, it is also configured to perform additional functions.

Particularly, where SCO station 10 operates as an "initiating" SCO station, computer 30 is also configured to obtain and/or generate a set of the customer's biometric and contextual data, identify one or more other SCO stations configured to complete transaction processing, and send that "initial" data set to a selected target SCO station. Where SCO station 10 operates as a "target" SCO station, computer 30 is configured to receive the "initial" set of the customer's biometric and contextual data, obtain and/or generate another set of the customer's biometric and contextual data, compare the two data sets, and based on the comparison, authorize the customer to complete the transaction at the target SCO station. Regardless of whether the SCO station 10 is operating as an "initiating" SCO station or a "target" SCO station, however, an SCO station 10 configured according to the present embodiments is configured to permanently destroy all biometric and contextual data associated with the customer without storing or saving that data to a memory, and without sending that data to another device that will save or store that data to memory.

Figure 2:
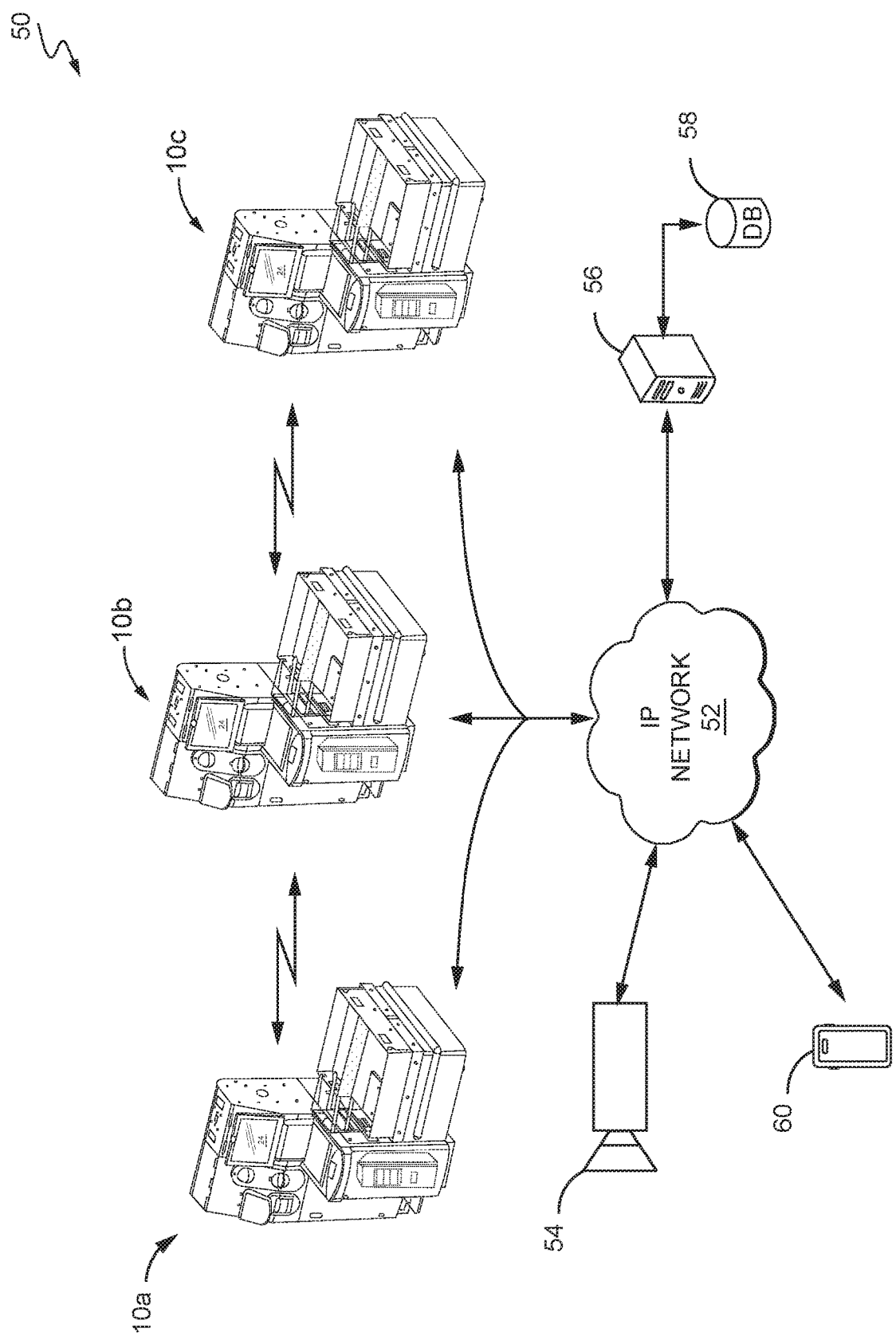
FIG. 2 illustrates a system in which an SCO station configured according to one embodiment of the present disclosure can operate.

FIG. 2 is a block diagram illustrating a system 50 in which an SCO station 10 is configured to operate. It should be noted that although system 50 is discussed in the context of a retail establishment, this is for illustrative purposed only. Those of ordinary skill in the art will readily appreciate that system 50 may be used in any type of retail establishment having a presence at a physical location. Further, those of ordinary skill in the art will understand that not all of the components comprising system 50 need to be physically disposed in the store. With the exception of the SCO stations 10 and cameras 54, one or more of the components comprising system 50 may be located remotely from the store.

Regardless, this embodiment of system 50 comprises an IP network 52 communicatively interconnecting a plurality of SCO stations 10a, 10b, 10c (collectively, "SCO stations 10"), one or more cameras 54, and one or more computer servers 56 that may, in some embodiments, be operatively connected to a database (DB) 58. Additionally, as described in more detail later, network 52 may be configured to support a user application executing on a customer's mobile device 60 to facilitate customer interaction and identification with system 50.

IP network 52 may comprise any private or public data network known in the art, such as the Internet, for example, but is capable of communicating packets of data utilizing the well-known Internet Protocol (IP). Such data includes, as described in more detail below, image data captured by the one or more cameras 54, commands, signals, and data required for computer server 56 to perform its functions, and in some embodiments, data communicated with the customer's mobile device 60.

Cameras 54 may comprise any camera known in the art capable of capturing video imagery and/or still images, and then communicating those captured images to one or more of the SCO stations 10. For example, in one embodiment, cameras 54 comprise a network of security cameras already existing at a brick-and-mortar retail establishment. Used conventionally, cameras 54 output captured images to corresponding display devices where a human operator (e.g., a store employee) scans the images in real time. Alternatively, cameras 54 conventionally output captured images to one or more recording devices for subsequent review by a human operator. According to embodiments of the present disclosure, however, the functionality of cameras 54 is extended from typical security operations to identify customers.

According to the present embodiments, cameras 54, when present, capture images of customers when they initiate a sales transaction at a first SCO station 10 (e.g., SCO station 10a), and then again when the customer subsequently attempts to complete the sales transaction at another SCO station 10 (e.g., SCO station 10b or SCO station 10c). The captured images are sent to a computing device (e.g., computer 30 at SCO station 10 or computer server 56) for processing to extract the biometric and contextual data of the customer that is subsequently analyzed to authorize the customer to execute the sales transaction across different SCO stations 10.

Computer server 56 is configured, in some embodiments, to perform image analysis functions that produce the biometric and contextual data associated with customers. This is useful, for example, in systems 50 where the computers 30 associated with the individual SCO stations 10 are not capable of performing such analyses. Further, although computer server 56 may communicatively connect to one or more DBs 58, computer server 56 does not send the biometric and contextual data to DB 58 for long term storage. Rather, when used in the present embodiments, computer server 56 is configured to send the captured images and/or the results of the image analyses/comparisons to the SCO stations 10. All biometric and contextual data used by the computer server 56, as well as the images that are used in the analysis, are thereafter permanently destroyed by computer server 56.

Figure 3A:
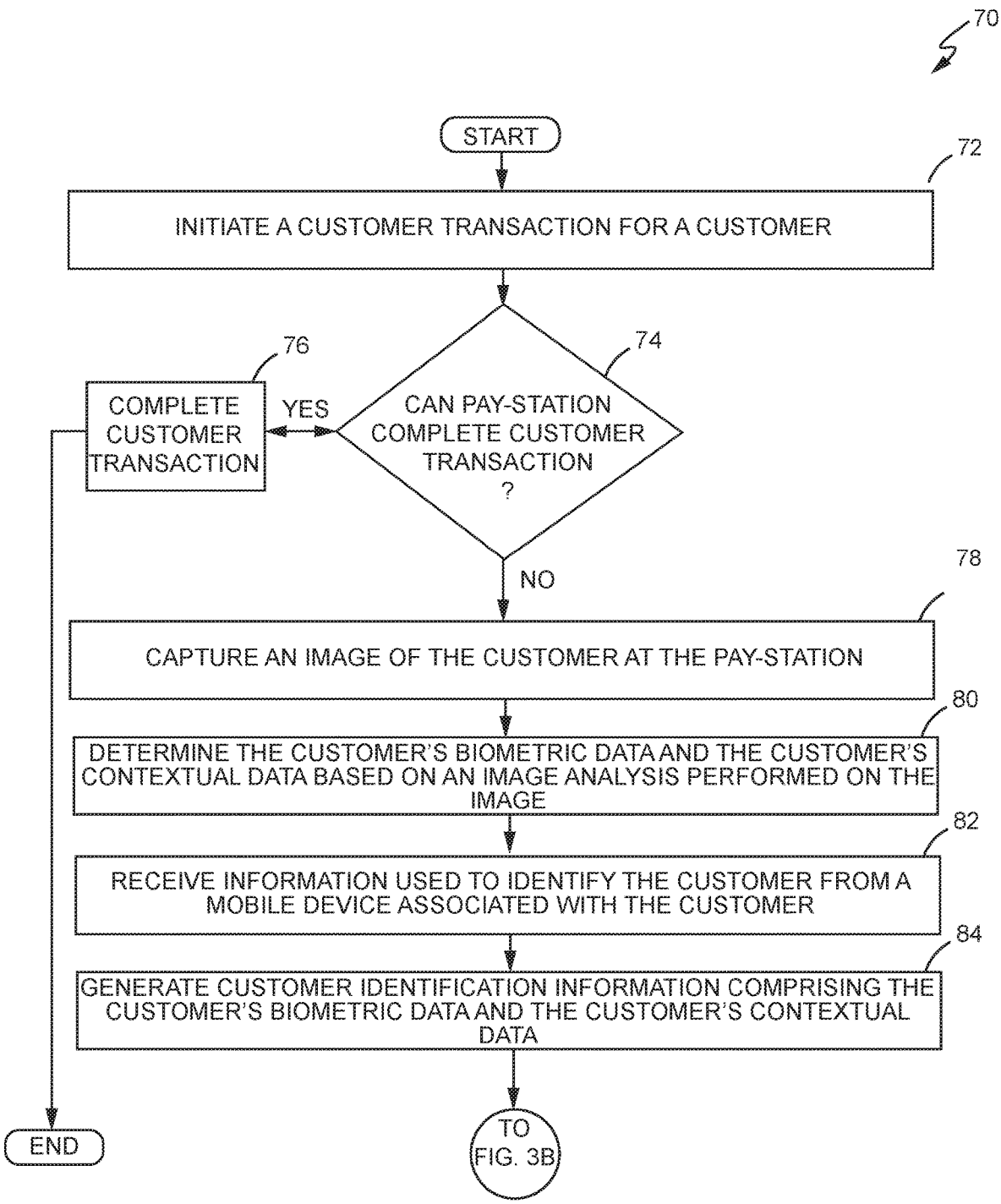
FIGS. 3A-3B are flow charts illustrating a method for routing customers from a first SCO station to a second, target SCO station according to one embodiment of the present disclosure.
Figure 3B:
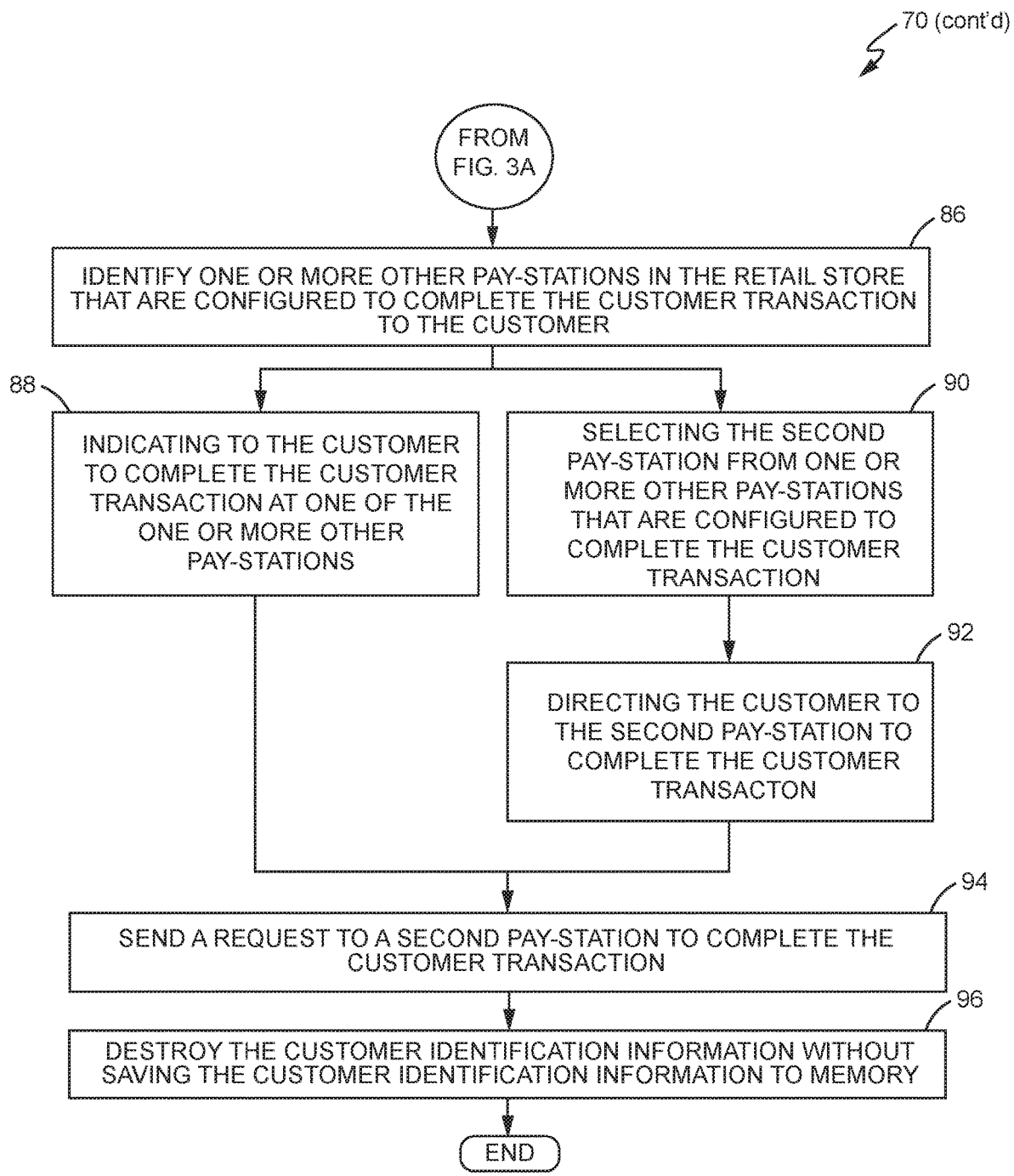

FIGS. 3A-3B are flow charts for a method 70 of checking out a customer in a retail store according to one embodiment of the present disclosure. As seen in FIG. 3A, method 70 is implemented at an "initiating" SCO station 10a.

Method 70 begins with SCO station 10a initiating a sales transaction for a user (box 72). For example, in one embodiment, the customer begins the sales transaction at an SCO station 10a simply by scanning his or her items for purchase. As another example, SCO station 10a may detect the presence of customer using any of a variety of proximity detection techniques (e.g., using cameras 26 and/or 54), and in response, initiate the sales transaction automatically. Regardless of how the transaction is initiated, however, the "initiating" SCO station 10a makes a determination as to whether it is configured to complete the transaction (box 74). By way of example, the customer may indicate that he/she wants to pay for the scanned items with cash. If the SCO station 10a is configured to accept cash, the SCO station 10a completes the transaction (box 76) and method 70 ends. However, if SCO station 10a is not configured to accept cash payments, SCO station 10a captures one or more images of the customer at SCO station 10a (box 78). As previously described, the images may be captured by SCO station 10a using its own camera 26, or by one or more of the security cameras 54 trained on the SCO station 10a. In these latter embodiments, where SCO station 10a is not configured to communicate or control cameras 54 directly, SCO station 10a may send a request or command to computer server 56 to capture the images and return the images to SCO station 10a.

Regardless of how the images are captured, the images are analyzed by computer 30 to determine the customer's biometric and contextual data (box 80). By way of example only, computer 30 may utilize well-known image analysis techniques to extract one or more facial features of the customer from the captured image to serve as the biometric data, as well as determine that the customer is wearing an article of clothing that is red, such as a red hat or a red jacket, to serve as the contextual data. In one embodiment, computer 30 is also configured to receive information identifying the customer from the customer's mobile device 60, which may also serve as contextual data (box 82). Such information may comprise, for example, the IMSI of the mobile device 60, or any other data stored on mobile device 60 that can be utilized in conjunction with the extracted biometric data to uniquely identify the customer. Once computer 30 receives or obtains the biometric and contextual data, computer 30 generates customer identification information comprising values representing the biometric and contextual data (box 84).

As seen in FIG. 3B, SCO station 10*a* then identifies one or more other "target" SCO stations 10*b*, 10*c* that are configured to complete the customer transaction (box 86). For example, SCO station 10*a* may be configured with a list of all SCO stations in the retail store along with their particular capabilities, each of which can be a potential target SCO station 10*b*, 10*c*. In another embodiment, SCO station 10*a* sends messages directly to the other SCO stations 10*b*, 10*c* in the retail store requesting that they indicate whether they are configured to complete the particular transaction initiated at SCO station 10*a*. Those SCO stations that reply to the request indicating that they are configured to handle the transaction are then considered target SCO stations 10*b*, 10*c*. In yet another embodiment, computer server 56 is provisioned, or has access to, information that defines the capabilities of all the SCO stations 10 in the store. In these latter embodiments, SCO station 10*a* may obtain a list of target SCO stations 10*b*, 10*c* that are configured to handle the current transaction.

Regardless, of how the target SCO stations 10*b*, 10*c* are identified, however, SCO station 10*a* can transfer the customer transaction data to, and route the customer to, a target SCO station 10*b*, 10*c* in multiple ways. In one embodiment, for example, SCO station 10*a* is configured to display a list of all SCO stations 10*b*, 10*c* in the store that are configured to complete the current transaction (box 88). The customer is then free to arbitrarily choose one of the indicated SCO stations 10*b*, 10*c* and go to that SCO station to complete the transaction. In these cases, initiating SCO station 10*a* would transfer the customer identification information and any other transaction-related data to each of the target SCO stations 10*b*, 10*c* so that the customer could compete the transaction at the station of his/her choice. The SCO station 10*b* or 10*c* that the customer did not go to would be configured to permanently destroy the received information without saving the information to memory.

In another embodiment, SCO station 10*a* selects a particular target SCO station 10*b* or 10*c* from the list of potential target SCO stations (box 90) and directs the customer to go to the selected target SCO station 10*b* or 10*c* (box 92). In these embodiments, the SCO station 10*a* may consider how many customers are already waiting at the target SCO station 10*b*, 10*c*, and select one of the target SCO stations 10*b*, 10*c* based on that information. This allows the initiating SCO station 10*a* (or some other entity in system 50) to "balance the load" of customers across the available target SCO stations 10*b*, 10*c*.

Once the target SCO stations 10*b* 10*c* that are able to complete the transaction are identified to the customer, or the customer is directed to a specific "target" SCO station 10*b* or 10*c*, the SCO station 10*a* that initiated the transaction temporarily suspends the transaction and sends a message to each of the target SCO station(s) 10*b* and/or 10*c*. The message comprises a request to complete the transaction for the customer (box 94), and includes the data needed to authenticate the customer to complete the transaction.

In one embodiment, the data comprises the customer identification information generated from the biometric data and the contextual data by SCO station 10*a*. In some cases, the data in the message may also include any transaction data already entered by the customer at SCO station 10*a*. Sending the transaction data provided so far be the customer helps prevent the customer from having re-scan items already scanned at SCO station 10*a*. After sending the customer identification information to the target SCO station(s) 10*b*, 10*c*, the customer transaction is temporarily suspended, and SCO station 10*a* destroys the customer identification information without saving the information to memory (box 96). This includes permanently destroying all biometric data and contextual data used to identify the customer at the SCO station 10*a*.

Figure 4:
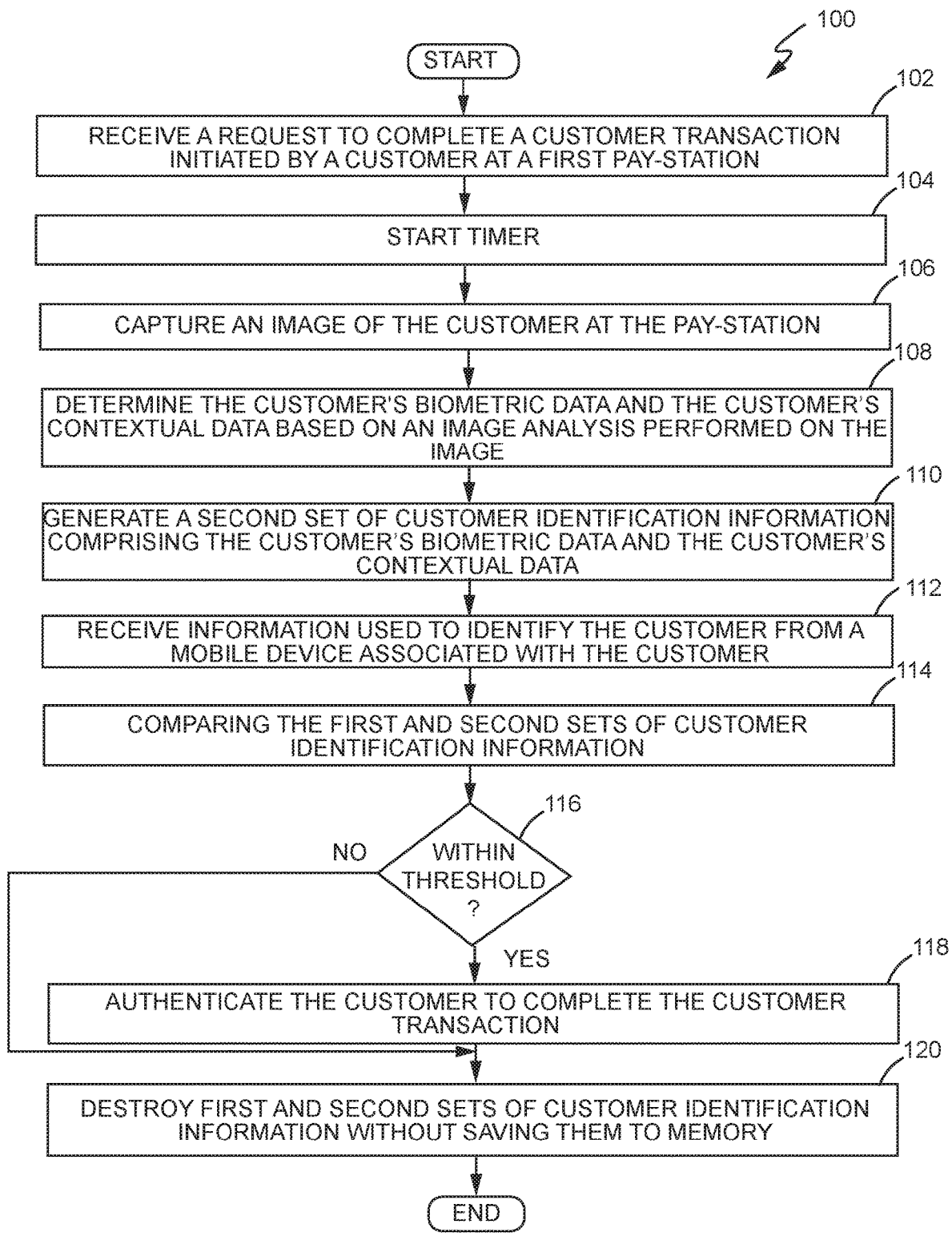
FIG. 4 is a flow chart illustrating a method for authorizing the customer to complete a transaction at the target SCO station according to one embodiment of the present disclosure.

FIG. 4 is a flowchart illustrating a method 100 for completing the customer checkout process according to one embodiment of the present disclosure. As discussed in the context of FIG. 4, method 100 is implemented at a target SCO station 10*b*. However, in some embodiments, method 100 may be implemented, at least partially, at computer server 56.

As seen in FIG. 4, each of the one or more target SCO stations 10*b*, 10*c* receives the request from the initiating SCO station 10*a* to complete the transaction for the customer (box 102). As stated previously, the request message includes the data necessary for completing the suspended transaction, and for authenticating the customer to complete the transaction. Thus, the data comprises the customer identification information generated from the biometric and contextual data at SCO station 10*a*, as well as any transaction data the customer may have entered at SCO station 10*a*.

Each target SCO station 10*b*, 10*c* that receives the request message then starts a timer (box 104). The timer defines an amount of time during which the customer identification information remains "live." When the timer expires, the associated target SCO station 10*b*, 10*c* permanently destroys the customer identification information without saving the information to long-term memory.

When the customer arrives to complete the transaction at one of the target SCO stations (e.g., target SCO station 10*b*), camera 26 and/or 54 captures another image of the customer (box 106). As above, the customer may manually indicate his/her presence at the target SCO station 10*b*, or the customer may be sensed or detected upon arriving at target SCO station 10*b*. Thereafter, using well-known techniques, the target SCO station 10*b* analyzes the captured image to determine the customer's biometric and contextual data (box 108), and generates a second set of customer identification information from the customer's biometric and contextual data (box 110). In some embodiments, target SCO station 10*b* also obtains other contextual information such as the IMSI of the customer's mobile device 60 (box 112). Once the customer identification information has been obtained, the target SCO station 10 compares that information to the customer identification information generated by, and received from, the initiating SCO station 10*a* (box 114). Provided the data values in these two data sets match to within a predetermined threshold (e.g., 98%) (box 116), target SCO station 10*b* authenticates the customer to complete the transaction (box 118). Regardless of whether the data does or does not match, however, the customer identification information generated at the initiating SCO station 10*a* and at the target SCO station 10*b* is permanently destroyed without being saved to persistent memory (box 120).

It should be noted that according to the present embodiments, the customer images captured at target SCO station 10*b* are analyzed to determine the same types of biometric and contextual data that were determined at initiating SCO station 10*a*. For example, if initiating SCO station 10*a* were to analyze its images to obtain or determine a customer's facial characteristics and the color of a jacket worn by the customer, the target SCO station 10*b* would also analyze its images to obtain or determine the customer's facial characteristics and the color of a jacket worn by the customer. This is so the information generated by the initiating and target SCO stations 10*a*, 10*b*, 10*c* can be properly compared and used to authenticate the customer to complete the transaction at the target SCO stations 10*b*, 10*c*. To accomplish this, all SCO stations 10 may be preconfigured to obtain or determine the same types of biometric and contextual data. Alternatively, however, the initiating SCO station 10*a* may obtain or determine the biometric and contextual data dynamically, and then identify those particular biometric and contextual characteristics to the target SCO station(s) 10*b*, 10*c*, in the request message. Upon receipt, the target SCO station 10*b*, 10*c* would analyze its captured images based on those identified characteristics to obtain or determine the same type of data.

For example, consider a situation in which a customer wearing a hat begins a self-checkout transaction at initiating SCO station 10*a*. When analyzing an image captured of the customer, the initiating SCO station 10*a* could try to extract facial feature data to utilize for the biometric data and determine the color and/or type of the customer's shirt. Because the customer is wearing a hat, however, it may be difficult for initiating SCO station 10 to fully determine all of the customer's facial feature data. Additionally, it might be extremely difficult to discern any biometric data with respect to the customer's eyes or hair. Realizing that it may not have adequate biometric data to identify the customer at one of the target SCO stations 10*b*, 10*c*, one embodiment of initiating SCO station 10*a* dynamically selects other parts of the image to analyze for use in identifying the customer.

By way of example only, one embodiment of the initiating SCO station 10*a* is configured to dynamically determine additional contextual data such as the color of the customer's hat, the identity of a company associated with a logo or patch on the customer's clothing, or one or more of the size, shape, and placement of the logo or patch on the customer's clothing. Additionally, as previously described, the initiating SCO station 10*a* may establish a short-range communications link with the customer's mobile device to obtain identifying information from that device, such as the IMSI. Regardless of what data the initiating SCO station 10*a* obtains, it would identify the particular biometric and contextual aspects in the image it used to generate the customer identification information and indicate those aspects to the target SCO stations 10*b*, 10*c* in the request message. Armed with this information, the target SCO stations 10*b*, 10*c* would then analyze its captured image to determine the same or similar biometric and contextual aspects to use in the comparison when authenticating the customer to complete the transaction.

It should be noted that the functional aspects of the disclosure have been discussed to this point as being performed at a computer 30 associated with an individual SCO station 10. While this occurs in some embodiments, the present disclosure is not so limited. In other embodiments, for example, some or all of the functionality discussed above is performed at the computer server 56. Particularly, there may be situations in which the computer server 56 is better equipped or specially configured to perform certain "high CPU cost" functions, such as the image analyses, the biometric and contextual data processing/extraction, and the comparison of the two analyses. In these cases, computer 30 could communicate the data needed for the computer server 56 to perform those functions, and receive the results and/or commands from computer server 56 with respect to performing the transaction.

For example, if a comparison of the customer identification information performed at computer server 56 indicates that the customer is permitted to complete a transaction, computer server 56 may send a command to the target SCO station (e.g., target SCO station 10*b*) indicating that the transaction can be completed. If the comparison indicates that the customer is not permitted to complete the transaction, however, computer server 56 could send a negative indication or command to the target SCO station preventing the completion of the transaction. In these latter cases, an employee of the retail store may also be notified so that they can render assistance to the customer.

Figure 5:
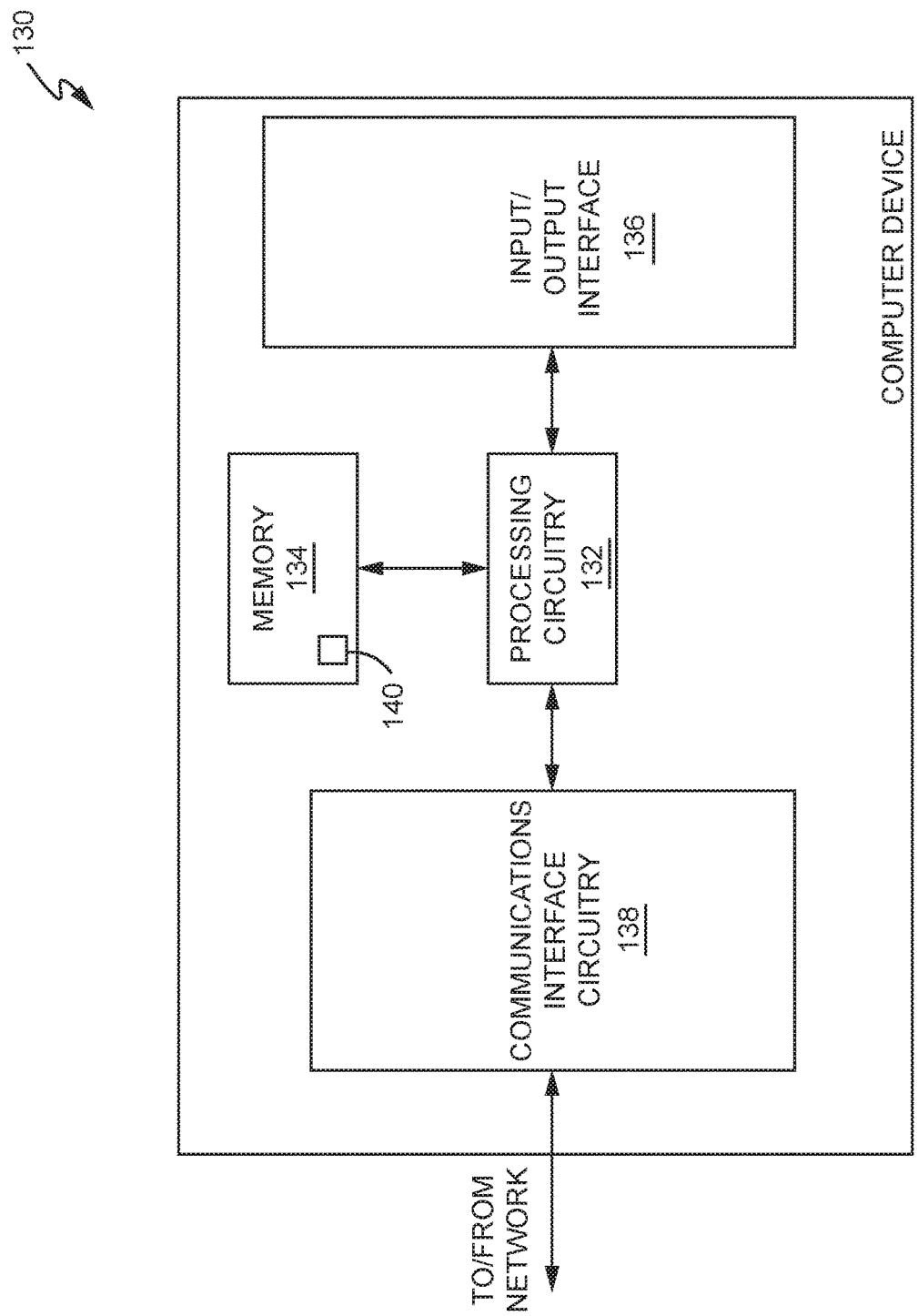
FIG. 5 is a block diagram illustrating some components of a computer device configured to function according to one embodiment of the present disclosure.

FIG. 5 is a schematic block diagram illustrating the main functional components of a computer device 130 configured according to one embodiment of the present disclosure. In particular, computer device 130 may be configured as the computer 30 in the SCO stations 10, or it may be configured as the computer server 56.

As seen in FIG. 5, computer device 130 comprises processing circuitry 132, memory 134, an input/output (I/O) interface 136, and communications interface circuitry 138. Processing circuitry 132 comprises one or more microprocessors, hardware circuits, firmware or a combination thereof. In the exemplary embodiments described herein, processing circuitry 132 is configured to control the operation and functioning of SCO station 10, regardless of whether SCO station 10 is an initiating SCO station 10*a* or a target SCO station 10*b*.

When controlling the operation of an initiating SCO station 10*a*, processing circuitry 132 is configured to initiate customer transactions and determine whether it is able to complete the customer transaction. Responsive to determining that it is unable to complete the customer transaction, processing circuitry 132 generates customer identification information comprising the customer's biometric data and contextual data, and sends a request to a second target SCO station, such as one or both of the target SCO stations 10*b*, 10*c*, to complete the customer transaction. As stated above, the request comprises a list of items for purchase by the customer and the customer identification information. Once the request has been sent, processing circuitry 132 destroys the customer identification information without saving the customer identification information to memory, as previously described.

When controlling the operation of a target SCO station 10*b* or 10*c*, the processing circuitry 132 is configured to receive the requests from the initiating SCO station 10*a* to complete the customer transaction initiated by the customer. As previously stated, the received request includes a list of items for purchase by the customer, and the set of customer identification information generated by the initiating SCO station 10*a*. The processing circuitry 132 in this capacity also authenticates the customer to complete the customer transaction at the target SCO station 10*b*, 10*c* based on the first set of customer identification information, and destroys that customer identification information without saving it to memory. Processing circuitry 132 then completes the customer transaction responsive to authenticating the customer.

Memory 134 comprises a non-transitory computer readable medium that stores executable program code and data used by the processing circuitry 132 for operation. In this embodiment, the program code and data comprise a control program 140 that, when executed by processing circuitry 132, configures computer device 130 to perform the functions previously described. In some embodiments, control program 140 will store certain data needed by control program 140 to perform its functions. By way of example only, such data includes, but is not limited to, its own capabilities as well as the identities and capabilities of the other SCO stations 10 in the store. Additionally, memory 134 may be utilized in some cases to temporarily buffer the customer identification information. However, memory 134 does not store any of the customer identification information long-term. As stated above, that information and data is permanently destroyed without saving it to memory 134.

Memory 134 may include both volatile and non-volatile memory, and may comprise random access memory (RAM), read-only memory (ROM), and electrically erasable programmable ROM (EEPROM) and/or flash memory. Additionally or alternatively, memory 132 may comprise discrete memory devices, or be integrated with one or more microprocessors in the processing circuitry 132.

The user I/O interface 136 comprises, in one or more embodiments, one or more input devices and display devices to enable a user, such as a customer, store associate, or operator, for example, to interact with and control SCO station 10. Such devices may comprise any type of device for inputting data into a computing device including, but not limited to, camera 26, keyboards, number pads, push buttons, touchpads, touchscreens, or voice activated inputs. The display devices that comprise user I/O interface 136 may comprise, for example, a liquid crystal display (LCD) or light emitting diode (LED) display. In some embodiments, the display device may comprise a touchscreen display that also functions as a user input device. Such a display device may be, for example, display 24.

The communications interface circuit 138 comprises, in one embodiment, a transceiver circuit and/or interface circuit for communicating with remote devices over a communication network or direct communication link. For example, the communications interface circuit 138 may comprise a WiFi interface, a cellular radio interface, a BLUETOOTH interface, an Ethernet interface, or other similar interface for communicating over a communication network or a wireless communication link. Computer device 130 may use the communications interface circuit 138, for example, to communicate with other SCO stations 10 in the store, for example, as well as with computer server 56 via a communications network, a database, other remote computing devices, and the one or more cameras 54 that capture images of customers using the SCO stations 10, as previously described.

FIG. 6 is a schematic block diagram illustrating a computer program product, such as control program 140. As stated above, control program 140 comprises executable code that, when executed by processing circuitry 132, causes computer device 130 to, inter alia, control the operation and functioning of SCO station 10 as one or both of an initiating SCO station 10a or a target SCO station 10b, 10c, as previously described.

As seen in FIG. 6, the control program 140 may be embodied in a non-transitory, computer-readable medium, such as the memory 134 of computer device 130, or alternatively, in a removable memory device, such as a thumb drive or disc.

Control program 140 in this embodiment comprises a customer transaction module/unit 150, an image capture and analysis module/unit 152, a customer data obtaining module/unit 154, a customer identification information generation module/unit 156, a customer authentication module/unit 158, a pay-station identification and selection module/unit 160, a customer identification information destruction module/unit 162, and a communications interface module/unit 164.

The customer transaction module/unit 150 comprises program code executed by processing circuitry 132 to initiate and complete customer transactions. The image capture and analysis module/unit 152 comprises program code executed by processing circuitry 132 to control camera 26 and/or camera(s) 54 to capture images of the customer at the SCO station 10, as well as analyze those captured images. The customer data obtaining module/unit 154 comprises program code executed by processing circuitry 132 to obtain the biometric data and the contextual data based on the analysis, and in some embodiments, obtain identifying information for a customer's mobile device. The customer identification information generation module/unit 156 comprises program code executed by processing circuitry 132 to generate the customer identification information from the biometric and contextual data, and the customer authentication module/unit 158 comprises program code executed by processing circuitry 132 to compare different sets of customer identification information and authenticate customers to complete suspended transactions. The pay-station identification and selection module/unit 160 comprises program code executed by processing circuitry 132 to identify other SCO stations 10 in the retail store as candidate target SCO stations based on their capabilities and the needs of the customers, and in some embodiments, select a particular target SCO station in which to route the customers to complete transaction. The customer identification information destruction module/unit 162 comprises program code executed by processing circuitry 132 to permanently destroy the customer identification information without saving it to memory, and the communications interface module/unit 164 comprises program code executed by processing circuitry 132 to communicate information and data with the other remote devices in the retail store via network 12. Such devices include, but are not limited to, SCO stations 10, computer server 56, cameras 54, and the like.

It should be noted here that the various aspects of the disclosure are described in the context of a self-checkout pay station in a retail store. However, this is for illustrative purposes and ease of explanation only. In some aspects, one or both of the initiating and target SCO stations 10 are "manned" pay stations operated by a retail store associate. In other aspects, one or both of the initiating and target SCO stations 10 are store-owned mobile devices, and in some cases, the customers mobile device 60.

Additionally, it is noted that the previous embodiments describe the customer's biometric data as being data that represents the customer's facial characteristics. However, the present disclosure is not so limited. In some embodiments, for example, some or all of the SCO stations 10 are equipped with fingerprint scanners/readers so that they can obtain the customer's fingerprints. In other embodiments, some or all of the SCO stations 10 are equipped with touch-sensitive devices able to accept and read a customer's signature. Thus, the present embodiments are not limited solely to using face recognition techniques in order to obtain the customer's biometric data, but rather, may be configured to obtain and utilize the customer's fingerprints, signature, or any other biometric measurements by itself, or in combination with other biometric measurements.

The present embodiments may, of course, be carried out in other ways than those specifically set forth herein without departing from essential characteristics of the invention. Therefore, the present embodiments are to be considered in all respects as illustrative and not restrictive, and all changes coming within the meaning and equivalency range of the appended claims are intended to be embraced therein.

What is claimed is:

1. A method comprising:
    initiating, at an initiating pay-station of a retail store, a customer transaction for a customer, wherein initiating the customer transaction comprises generating a list of items for purchase by the customer;
    determining, at the initiating pay station, whether the initiating pay-station is able to process the customer transaction according to a payment requirement of one or both of the customer and the retail store; and
    responsive to determining that the initiating pay-station is unable to process the customer transaction according to the payment requirement:
        determining payment capabilities of each of a plurality of pay-stations in the retail store;
        identifying, from among the plurality of pay-stations in the retail store and based on the payment capabilities, one or more potential target pay-stations in the retail store that are capable of processing the customer transaction according to the payment requirement;
        automatically selecting, from among the one or more potential target pay-stations, a target pay-station to process the customer transaction according to the payment requirement;
        generating customer identification information comprising the customer's biometric data and contextual data, wherein the contextual data comprises non-biometric data that describes a characteristic of an article of clothing worn by the customer;
        sending the generated list of items for purchase by the customer and the customer identification information to the target pay-station;
        directing the customer to the target pay-station to complete the customer transaction according to the payment requirement; and
        destroying the customer identification information without saving the customer identification information to memory.

2. The method of claim 1 wherein generating customer identification information comprises:
    capturing an image of the customer at the initiating pay-station; and
    determining the customer's biometric data and the contextual data based on an image analysis performed on the image.

3. The method of claim 1 further comprising receiving the contextual data from a mobile device associated with the customer.

4. The method of claim 1 further comprising indicating to the target pay-station when the target pay-station is to destroy the customer identification information.

5. A pay-station comprising:
    a communications interface circuitry configured to communicate data with one or more other pay-stations in a retail store; and
    processing circuitry operatively connected to the communications interface circuitry and configured to:
        initiate, at the pay station, a customer transaction for a customer, wherein the customer transaction identifies a list of items for purchase by a customer;
        determine whether the pay-station is configured to process the customer transaction according to a payment requirement of one or both of the customer and the retail store; and
        responsive to determining that the pay-station is unable to process the customer transaction according to the payment requirement:
            determine payment capabilities of each of a plurality of pay-stations in the retail store;
            identify, from among the plurality of pay-stations in the retail store and based on the payment capabilities, one or more potential target pay-stations in the retail store that are capable of processing the customer transaction according to the payment requirement;
            automatically select, from among the one or more potential target pay-stations, a target pay-station to process the customer transaction according to the payment requirement;
            generate customer identification information comprising the customer's biometric data and contextual data, wherein the contextual data comprises non-biometric data that describes a characteristic of an article of clothing worn by the customer;
            send the list of items for purchase by the customer and the customer identification information to the target pay-station;
            direct the customer to the target pay-station to complete the customer transaction according to the payment requirement; and
            destroy the customer identification information without saving the customer identification information to memory.

6. The pay-station of claim 5 wherein the processing circuitry is further configured to determine the customer's biometric data and the contextual data based on an image analysis performed on an image of the customer captured when the customer is proximate the pay-station.

7. The pay-station of claim 6 wherein the processing circuitry is further configured to receive the contextual data from a mobile device associated with the customer.

8. The pay-station of claim 6 wherein the processing circuitry is further configured to send a timer to the target pay-station, wherein the timer defines a maximum length of time the target pay-station has to authenticate the customer.

9. A non-transitory computer readable medium comprising a computer program stored thereon, the computer program comprising instructions that, when executed by processing circuitry of a pay-station of a retail store, causes the pay-station to:
    initiate, at the pay-station, a customer transaction for a customer, wherein the customer transaction identifies a list of items for purchase by a customer;
    determine whether the pay-station is configured to process the customer transaction according to a payment requirement of one or both of the customer and the retail store; and responsive to determining that the pay-station is unable to process the customer transaction according to the payment requirement:
  determine payment capabilities of each of a plurality of pay-stations in the retail store;
  identify, from among the plurality of pay-stations in the retail store and based on the payment capabilities, one or more potential target pay-stations in the retail store that are capable of processing the customer transaction according to the payment requirement;
  automatically select, from among the one or more potential target pay-stations, a target pay-station to process the customer transaction according to the payment requirement;
  generate customer identification information comprising the customer's biometric data and contextual data, wherein the contextual data comprises non-biometric data that describes a characteristic of an article of clothing worn by the customer;
  send the list of items for purchase by the customer and the customer identification information to the target pay-station;
  direct the customer to the target pay-station to complete the customer transaction according to the payment requirement; and
  destroy the customer identification information without saving the customer identification information to memory.

* * * * *